US012547398B2

(12) United States Patent
Burgess et al.

(10) Patent No.: US 12,547,398 B2
(45) Date of Patent: *Feb. 10, 2026

(54) SYSTEMS AND METHODS FOR MANAGING A SOFTWARE REPOSITORY

(71) Applicant: Capital One Services, LLC, McLean, VA (US)

(72) Inventors: Brian Burgess, Richmond, VA (US); Benjamin Cabell Glancy, Richmond, VA (US); Narender Pashikant, Ashburn, VA (US); Guganathan Sellamuthu, Glen Allen, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/605,691

(22) Filed: Mar. 14, 2024

(65) Prior Publication Data

US 2024/0220238 A1    Jul. 4, 2024

Related U.S. Application Data

(63) Continuation of application No. 17/515,746, filed on Nov. 1, 2021, now Pat. No. 11,941,393.

(51) Int. Cl.
*G06F 8/73* (2018.01)
*G06F 16/903* (2019.01)
(Continued)

(52) U.S. Cl.
CPC .......... *G06F 8/73* (2013.01); *G06F 16/90332* (2019.01); *G06F 16/90335* (2019.01); *G06N 3/08* (2013.01)

(58) Field of Classification Search
CPC ................. G06F 8/73; G06F 16/90332; G06F 16/90335; G06N 3/08
(Continued)

(56) References Cited

U.S. PATENT DOCUMENTS 8,102,406 B2    1/2012    Peleg et al.
8,527,979 B2    9/2013    Wookey
(Continued)

OTHER PUBLICATIONS

LeClair et al., "Adapting Neural Text Classification for Improved Software Categorization" 2018, IEEE, pp. 461-472. (Year: 2018).*
(Continued)

*Primary Examiner* — Ted T. Vo
(74) *Attorney, Agent, or Firm* — TROUTMAN PEPPER LOCKE LLP; Christopher J. Forstner; John A. Morrissett

(57) ABSTRACT

A system method of managing a software repository. The method including receiving a dataset comprising a set of computer instructions, retrieving feature-related data from the dataset, determining, by a machine learning model executing on the computing device, a function of the computer instructions based on the feature-related data, and generating a synopsis of the function of the computer instructions. The method can include transmitting the synopsis to a user interface and receiving feedback from a user indicative of whether the synopsis accurately describes the function of the computer instructions. If the feedback indicates that the synopsis accurately describes the function of the computer instructions, the method can include storing the synopsis in a memory of the computing device. If the feedback indicates that the synopsis inaccurately describes the function of the computer instructions, the method can include generating a revised synopsis of the function of the computer instructions.

19 Claims, 4 Drawing Sheets

(51) Int. Cl.
  *G06F 16/9032* (2019.01)
  *G06N 3/08* (2023.01)
(58) Field of Classification Search
  USPC .................................................. 717/120–123
  See application file for complete search history.

(56) References Cited

U.S. PATENT DOCUMENTS

| | | |
|---|---|---|
| 8,635,204 B1 | 1/2014 | Xie et al. |
| 9,003,366 B2 | 4/2015 | Zeidman |
| 10,909,313 B2 | 2/2021 | Can et al. |
| 10,977,258 B1 | 4/2021 | Liu et al. |
| 11,392,840 B2 | 7/2022 | Santhanam et al. |
| 11,699,432 B2 * | 7/2023 | Bender .................. G16H 70/60 704/231 |
| 11,941,393 B2 * | 3/2024 | Burgess .................... G06F 8/75 |
| 2017/0024452 A1 | 1/2017 | Budalakoti et al. |
| 2021/0149886 A1 | 5/2021 | Zheng et al. |

OTHER PUBLICATIONS

LeClair et al., "Recommendations for Datasets for Source Code Summarization", 2019, arXiv, 7 pages. (Year: 2019).*
LeClair et al., "Improved Code Summarization via a Graph Neural Network", 2020, ACM, pp. 184-195. (Year: 2020).*
White et al., "Toward Deep Learning Software Repositories," 2015, IEEE, pp. 334-345 (Year: 2015).
Yu et al., "CS*: Approximate Query Processing on Big Data using Scalable Join Correlated Sample Synopsis," 2019, IEEE, pp. 583-592 (Year: 2019).
Zhang et al, "Retrieval-based Neural Source Code Summarization," 2020, IEEE, pp. 1385-1397. (Year: 2020).

* cited by examiner

SYSTEMS AND METHODS FOR MANAGING A SOFTWARE REPOSITORY

CROSS-REFERENCE TO RELATED APPLICATIONS

This application is a continuation of, and claims priority under 35 U.S.C. § 120 to, U.S. patent application Ser. No. 17/515,746, which issues as U.S. Pat. No. 11,941,393 on Mar. 26, 2024, filed Nov. 1, 2021, the entire contents of which are fully incorporated herein by reference.

FIELD

The disclosed technology relates to systems and methods for managing a software repository. In particular, the disclosed technology relates to systems and methods for automatically determining the intent of a set of computer instructions that is stored in a repository and generating a synopsis of the intent of the set of computer instructions.

BACKGROUND

Software repositories are commonly used by developers and organizations to store various software packages for future use and development. The repository provides a central location for software developers to search and retrieve information about software packages when assembling lines of code to develop a software program. Unfortunately, it is often difficult to search through a repository to find a software package that would be useful for a particular application. Developers generally have the arduous and time-consuming task of parsing through lines of code in an attempt to interpret the intent for which the software packages stored in the repository were developed. In other words, developers must read individual lines of code in each software package in an attempt to decipher the function or purpose of the software package because software packages often do not include a helpful summary of what the software package was designed to do. Furthermore, even if the repository includes a table of contents, the descriptions of the various software packages are often inadequate and unhelpful when attempting to determine an intent of the many software packages stored in the repository.

Some organizations have developed search engines to help developers search through software repositories. These search engines can be helpful when searching for a specific line of code or a specific term but are generally ineffective when trying to search for an overall function for which the software package was developed in the first place. Thus, even with a repository search engine, finding a software package stored in a software repository that is capable of performing a desired function can be a difficult task.

Accordingly, there is a need for improved systems and methods for managing a software repository to facilitate effective searching of software packages in a software repository. Embodiments of the present disclosure are directed to this and other considerations.

SUMMARY

The disclosed technology can include a method of managing a software repository. The method can include receiving, at a computing device, a dataset comprising a set of computer instructions and retrieving feature-related data from the dataset. The feature-related data can comprise data indicative of a feature of the set of computer instructions. The method can further include determining, by a machine learning model executing on the computing device, a function of the set of computer instructions based on the feature-related data and generating, by the machine learning model, a synopsis that can be a description of the function of the set of computer instructions. The method can include transmitting the synopsis to a user interface and receiving, from the user interface, feedback from a user indicative of whether the synopsis accurately describes the function of the set of computer instructions. In response to determining that the feedback indicates that the synopsis accurately describes the function of the set of computer instructions, the method can include storing the synopsis in a memory of the computing device. In response to determining that the feedback indicates that the synopsis inaccurately describes the function of the set of computer instructions, the method can include generating a revised synopsis of the function of the set of computer instructions.

In some examples, the machine learning model can be trained based on the feedback from the user.

In some examples, the method can further include receiving, at the computing device, a request to search the synopsis based on a search term. In response to determining that the set of computer instructions performs a function related to the search term, the method can include transmitting the synopsis to the user interface.

In some examples, generating the revised synopsis of the function of the set of computer instructions can further include generating the revised synopsis based on the feedback from the user interface. The feedback can include edits to the synopsis made by a user.

Generating the synopsis can include natural language processing. Furthermore, the machine learning model can include a recurrent neural network and the feature-related data can include programming language of the set of computer instructions.

The disclosed technology can include a method of managing a software repository. The method can include receiving, at a computing device, a dataset comprising a set of computer instructions and retrieving feature-related data from the dataset. The feature-related data can include data indicative of a feature of the set of computer instructions. The method can further include determining, by a machine learning model executing on the computing device, a function of the set of computer instructions based on the feature-related data and generating, by the machine learning model, a synopsis that can include a description of the function of the set of computer instructions. The method can include storing the synopsis in a memory of the computing device and receiving, at the computing device, a request to search the synopsis based on a search term. Furthermore, the method can include determining, based on the synopsis and the search term, whether the set of computer instructions performs a function related to the search term and transmitting the synopsis to a user interface.

The method can further include transmitting the synopsis to a user interface and receiving, from the user interface, feedback from a user indicative of whether the synopsis accurately describes the function of the set of computer instructions. In response to determining that the feedback indicates that the synopsis accurately describes the function of the set of computer instructions, the method can include storing the synopsis in a memory of the computing device.

In response to determining the feedback indicates that the synopsis inaccurately describes the function of the set of computer instructions, the method can include generating a revised synopsis of the function of the set of computer instructions.

Generating a revised synopsis of the function of the set of computer instructions can include generating the revised synopsis based on the feedback from the user interface. The feedback can include edits to the synopsis made by a user. Furthermore, generating the synopsis can include natural language processing and the machine learning model can include a recurrent neural network. The feature-related data can include programming language of the set of computer instructions.

The disclosed technology can include a system for managing a software repository. The system can include one or more processors and a memory in communication with the one or more processors. The memory can store instructions that are configured to cause the system to receive a dataset comprising a set of computer instructions and retrieve feature-related data from the dataset. The feature-related data can include data indicative of a feature of the set of computer instructions. The instructions can further cause the system to determine, using a machine learning model, a function of the set of computer instructions based on the feature-related data and generate, by the machine learning model, a synopsis comprising a description of the function of the set of computer instructions.

The memory can store further instructions that can be configured to cause the system to transmit the synopsis to a user interface and receive, from the user interface, feedback from a user indicative of whether the synopsis accurately describes the function of the set of computer instructions. In response to determining that the feedback indicates that the synopsis accurately describes the function of the set of computer instructions, the instructions can cause the system to store the synopsis in the memory.

The memory can store further instructions that can be configured to cause the system to, in response to determining the feedback indicates that the synopsis inaccurately describes the function of the set of computer instructions, generate a revised synopsis of the function of the set of computer instructions. Generating a revised synopsis of the function of the set of computer instructions further can include generating the revised synopsis based on the feedback from the user interface. The feedback can include edits to the synopsis made by the user.

The machine learning model can be trained based on the feedback from the user.

The memory can store further instructions that can be configured to cause the system to store the synopsis in a memory and receive a request to search the synopsis based on a search term. The instructions can further cause the system to determine, based on the synopsis and the search term, whether the set of computer instructions performs a function related to the search term. In response to determining that the set of computer instructions performs the function related to the search term, the instructions can cause the system to transmit the synopsis to a user interface.

Further features of the disclosed design, and the advantages offered thereby, are explained in greater detail hereinafter with reference to specific examples illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which illustrate various implementations, aspects, and principles of the disclosed technology.

DETAILED DESCRIPTION

Figure 1:
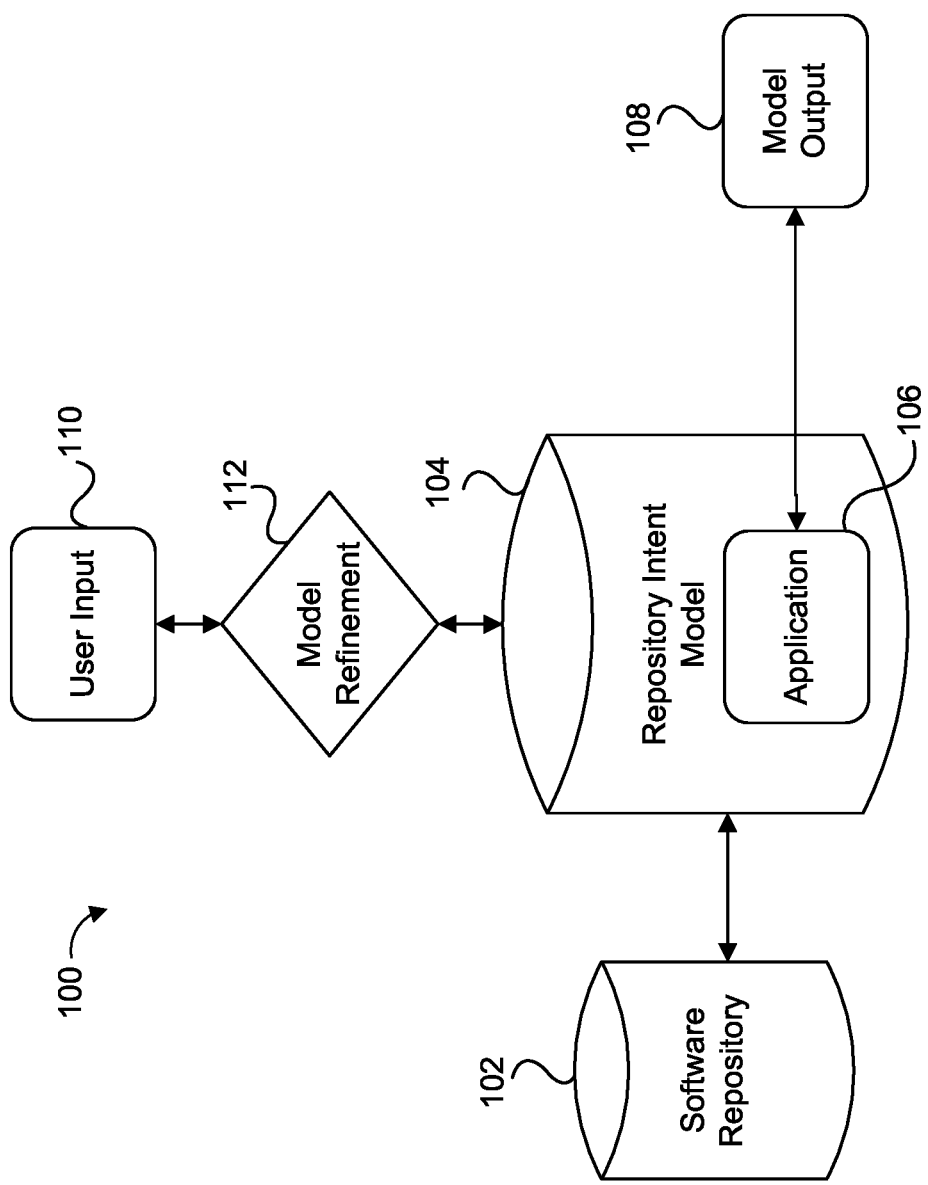
FIG. 1 illustrates an example system for managing a software repository, in accordance with an example of the disclosed technology.

Examples of the present disclosure relate to systems and methods for automatically determining a purpose or a function (an "intent") for which a software package stored in a repository was created and automatically generating a synopsis of the intent of the software. In particular, the disclosed technology includes a system and method that leverages a machine learning model to retrieve data from software packages stored in a repository, determine a purpose or a function of the software package, and automatically generate a synopsis describing the intent of the software package. In this way, the disclosed technology can make it easier for a user to search through a software repository and find software packages that are intended to perform a specific purpose or function. Furthermore, the disclosed technology can include training of the machine learning model to ensure the machine learning model is generating synopses that accurately describe the functions or purposes of the various software packages. As will become apparent throughout the disclosure, the machine learning model can become better able to generate accurate synopses over time.

Although various aspects of the disclosed technology are explained in detail herein, it is to be understood that other aspects of the disclosed technology are contemplated. Accordingly, it is not intended that the disclosed technology is limited in its scope to the details of construction and arrangement of components expressly set forth in the following description or illustrated in the drawings. The disclosed technology can be implemented and practiced or carried out in various ways. In particular, the presently disclosed subject matter is described in the context of being systems and methods for managing a software repository. The present disclosure, however, is not so limited, and can be applicable in other contexts. The present disclosure can, for example, include any application wherein packages of data are stored and are difficult for a user to search. Accordingly, when the present disclosure is described in the context of systems and methods for managing a software repository, it will be understood that other implementations can take the place of those referred to.

It should also be noted that, as used in the specification and the appended claims, the singular forms "a," "an," and "the" include plural references unless the context clearly dictates otherwise. References to a composition containing "a" constituent is intended to include other constituents in addition to the one named.

Also, in describing the disclosed technology, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, the disclosed technology can include from the one particular value and/or to the other particular value. Further, ranges described as being between a first value and a second value are inclusive of the first and second values. Likewise, ranges described as being from a first value and to a second value are inclusive of the first and second values.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" can be used herein to connote different aspects of methods employed, the term should not be interpreted as implying any particular order among or between various steps herein disclosed unless and except when the order of individual steps is explicitly required. Further, the disclosed technology does not necessarily require all steps included in the methods and processes described herein. That is, the disclosed technology includes methods that omit one or more steps expressly discussed with respect to the methods described herein.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, similar components that are developed after development of the presently disclosed subject matter.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 illustrates an example system 100 for managing a software repository, in accordance with an example of the disclosed technology. One of skill in the art will appreciate that the various features of the system 100 described herein can be incorporated into a single computing device or be divided into distinct parts across a network of computing devices. Thus, although the various features of the system 100 may be described as separate and distinct features or components, the described technology is not so limited. The system 100 can include a software repository 102 that can store feature-related data. The software repository 102, for example, can be a memory storing computer instructions (e.g., individual lines of code, computer program language, software modules, software packets, software programs, code modules, etc.) and data corresponding to the computer instructions and from which data about the computer instructions can be retrieved for future use. The software repository 102 can be stored in a memory that is local to an individual computer or can be stored on a server such as a cloud computing device allowing for remote access to the software repository 102.

The system 100 can further include a repository intent model 104 that can be configured to retrieve feature data from the software repository 102. The feature data, as non-limiting examples, can be or include lines of code in a set of computer instructions, comments written in the lines of code, readme data, metadata, summary data of the computer instructions, comments appended to the computer instructions, or any other data that can be indicative of the type, function, purpose, or other features of the computer instructions. In other words, the software repository 102 can store information related to the purpose or function of various computer instructions and the repository intent model 104 can be configured to retrieve this feature data from the computer instructions stored in the software repository 102.

The system 100 can further include an application 106 of the repository intent model 104 that can be configured to execute a machine learning model (or algorithm) to analyze the feature data and determine a function or purpose (an "intent") for which a selected set of computer instructions stored in the software repository 102 is designed to accomplish. After determining a function or purpose of the selected set of computer instructions, the application 106 can be configured to generate a synopsis of the set of computer instructions describing the function or purpose of the set of computer instructions. This can enable a user to determine the what the set of computer instructions can be used for when developing future software programs or packages. The synopses generated by the application 106 of the repository intent model 104 can be or include textualized descriptions of computer instructions stored in the software repository 102 such that a human user of the system 100 is able to read the synopses to obtain an understanding of what various computer instructions stored in the software repository were designed to accomplish. In this way, the disclosed technology can be configured to automatically generate and store synopses for each set of computer instructions stored in the software repository 102 such that a user is better able to determine the function of each set of computer instructions stored in the software repository 102.

The machine learning model executed by the application 106 of the repository intent model 104 can be or include a neural network, a recurrent neural network, a Long Short-Term Memory (LSTM) network, a bi-direction LS™ network, a Conditional Random Fields (CRF) network, an LS™-CRF network, a Bi-LS™-CRF network, or other suitable machine learning models. Furthermore, the machine learning model can be configured to perform natural language processing, natural language understanding, and/or other machine learning algorithms that can be configured to interpret data and determine a meaning of the data. For example, the machine learning model can include a neural network configured to perform natural language understanding to enable the repository intent model 104 to understand the meaning of text found in comments included in the feature data. As another example, the machine learning model can include a recurrent neural network configured to perform natural language processing to enable the repository intent model 104 to understand the meaning of the lines of code included in the feature data.

As a non-limiting illustrative example, when a user of the system 100 stores a set of computer instructions in the software repository 102, the application 106 of the repository intent model 104 can be configured to determine that a new set of computer instructions has been stored in the software repository 102. The application 106 can then retrieve feature data from the set of computer instructions and determine, using a machine learning model, the intent or purpose of the set of computer instructions. The application 106 can generate a synopsis that summarizes the intent of the computer instructions for a user of the system to read and interpret. This process can be repeated for any set of computer instructions stored in the software repository 102 until synopses have been generated for all sets of computer instructions stored in the software repository 102. In this way, the system 100 can be configured to make it easier for a user to search through the software repository 102 and find a particular set of computer instructions stored in the software repository.

In some examples, a user can search the software repository 102 by reading through the various synopses generated by the application 106 of the repository intent model 104. As will be appreciated, however, as the number of sets of computers instructions and corresponding synopses stored in the software repository 102 increases, reading through each synopsis can become an impractical task. To help reduce the amount of time spent searching the software repository 102, a user may employ a search engine or other searching algorithm to help locate a set of computer instructions that are configured to perform a specific task or function. The synopses can be searched directly by the search engine to help expedite the searching process. Since the synopses include textualized data describing the purpose or function of the set of computer instructions, the search engine can be configured to search based on a description of a function that a user wants to find. In this way, the user is not required to know the name of a set of computer instruction nor even a line of code or specific function used in the set of computer instructions. Therefore, the disclosed technology can make searching a software repository a much easier task than configurations currently known in the art.

Once the application 106 has generated a synopsis, the application 106 can also output the synopsis as a model output 108 such as, for example, outputting the synopsis to a user interface for a user to read. In other examples, the model output 108 can be an alert (e.g., a push notification, an email, a text, etc.) to alert a user that a new synopsis of a set of computer instructions has been generated. The user, after receiving the alert, can then go to a user interface and review the synopsis to determine whether the synopsis accurately describes the function or purpose of the set of computer instructions. The model output 108 can further include outputting the synopsis and storing the synopsis in a database along with other synopses generated by the application 106. As will be appreciated, the database can simply be a memory or other location wherein the various synopses generated by the application 106 of the repository intent model 104 are stored.

The system 100 can be further configured to refine the repository intent model 104 by performing model refinement 112. Model refinement 112 can include receiving a user input 110 indicative of whether a synopsis accurately or inaccurately describes a set of computer instructions and then performing actions based on the user input 110. As a non-limiting example, a user can review the synopsis generated by the repository intent model 104 and click a "yes" or "no" button in response to prompt asking whether the synopsis accurately describes the intent of the computer instructions. As another example, the user input 110 can include edits of the synopsis made by a user to correct inaccuracies which may be present in the synopsis or simply to make the synopsis easier for a user to read and understand. As will be appreciated by one of skill in the art, because the repository intent model 104 comprises a machine learning algorithm, the repository intent model 104 can receive the user input 110 to perform the model refinement 112 and gradually increase the accuracy of synopses of computer instructions generated by the machine learning model. In other words, the repository intent model 104 can learn how to generate more accurate synopses of sets of computer instructions as the repository intent model 104 receives more and more user input 110 over time.

As will be appreciated by one of skill, in the example just described which receives user input 110, the repository intent model 104 can be a supervised machine learning model. The user can review and provide input for every synopsis generated by the repository intent model 104 or the user can review only a portion of the total number of synopses generated by the repository intent model 104. The repository intent model 104 can become better able to generate synopses that accurately describe a purpose or function of the various sets of computer instructions as the repository intent model 104 is refined over time via the user input 110 and the model refinement 112. In other examples, the repository intent model 104 can be an unsupervised machine learning model that can automatically generate synopses describing the intent of a set of computer instructions. As will also be appreciated by one of skill in the art, generally the repository intent model 104 will be an unsupervised machine learning model only after the repository intent model 104 is sufficiently trained. A user may occasionally review a synopsis generated by the repository intent model 104 to ensure the repository intent model 104 continues to generate accurate synopses of the sets of computer instructions. The unsupervised machine learning model, however, can be configured to largely generate synopses without human input.

Figure 2:
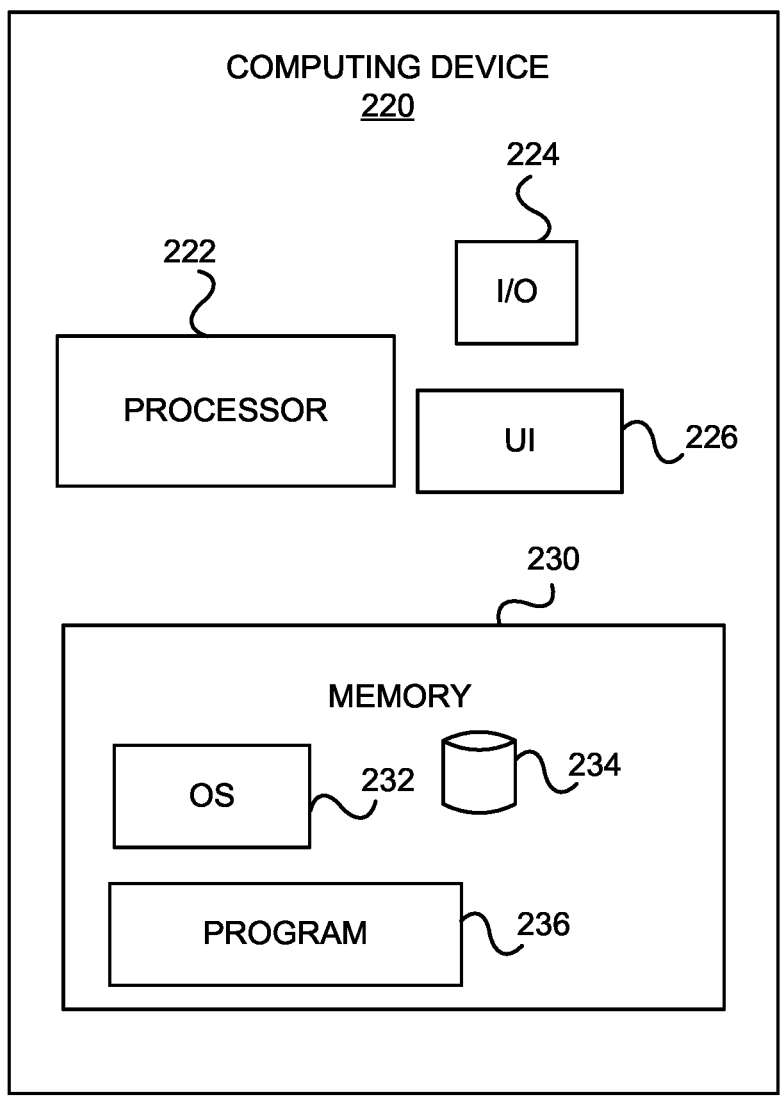
FIG. 2 illustrates an example computing device configured to manage a software repository, in accordance with an example of the disclosed technology.

FIG. 2 illustrates an example computing device configured to manage a software repository, in accordance with an example of the disclosed technology. As will be appreciated by one of skill in the art, the computing device 220 can be configured to include all or some of the features described in relation to the system 100. As shown, the computing device 220 may include a processor 222, an input/output ("I/O") device 224, a memory 230 containing an operating system ("OS") 232 and a program 236. In certain example implementations, the computing device 220 may be a single server or may be configured as a distributed computer system including multiple servers or computers that interoperate to perform one or more of the processes and functionalities associated with the disclosed embodiments. In some embodiments, computing device 220 may be one or more servers from a serverless or scaling server system. In some embodiments, the computing device 220 may further include a peripheral interface, a transceiver, a mobile network interface in communication with the processor 222, a bus configured to facilitate communication between the various components of the computing device 220, and a power source configured to power one or more components of the computing device 220.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 222 to communicate with other devices via wired or wireless networks, whether local or wide area, private or public, as known in the art. A power source may be configured to provide an appropriate alternating current (AC) or direct current (DC) to power components.

The processor 222 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 230.

The processor 222 may be one or more known processing devices, such as, but not limited to, a microprocessor from the Pentium™ family manufactured by Intel™ or the Turion™ family manufactured by AMD™. The processor 222 may constitute a single core or multiple core processor that executes parallel processes simultaneously. For example, the processor 222 may be a single core processor that is configured with virtual processing technologies. In certain embodiments, the processor 222 may use logical processors to simultaneously execute and control multiple processes. The processor 222 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the computing device 220 may include one or more storage devices configured to store information used by the processor 222 (or other components) to perform certain functions related to the disclosed embodiments. In one example, the computing device 220 may include the memory 230 that includes instructions to enable the processor 222 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the computing device 220 may include a memory 230 that includes instructions that, when executed by the processor 222, perform one or more processes consistent with the functionalities disclosed herein. Methods, systems, and articles of manufacture consistent with disclosed embodiments are not limited to separate programs or computers configured to perform dedicated tasks. For example, the computing device 220 may include the memory 230 that may include one or more programs 236 to perform one or more functions of the disclosed embodiments.

The processor 222 may execute one or more programs located remotely from the computing device 220. For example, the computing device 220 may access one or more remote programs that, when executed, perform functions related to disclosed embodiments.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 230 may include software components that, when executed by the processor 222, perform one or more processes consistent with the disclosed embodiments. In some examples, the memory 230 may include a database 234 configured to store various data described herein. For example, the database 234 can be configured to store the software repository 102 or data generated by the repository intent model 104 such as synopses of the computer instructions stored in the software repository 102, inputs received from a user (e.g., responses to questions or edits made to synopses), or other data that can be used to train the repository intent model 104.

The computing device 220 may also be communicatively connected to one or more memory devices (e.g., databases) locally or through a network. The remote memory devices may be configured to store information and may be accessed and/or managed by the computing device 220. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The computing device 220 may also include one or more I/O devices 224 that may comprise one or more user interfaces 226 for receiving signals or input from devices and providing signals or output to one or more devices that allow data to be received and/or transmitted by the computing device 220. For example, the computing device 220 may include interface components, which may provide interfaces to one or more input devices, such as one or more keyboards, mouse devices, touch screens, track pads, trackballs, scroll wheels, digital cameras, microphones, sensors, and the like, that enable the computing device 220 to receive data from a user.

In example embodiments of the disclosed technology, the computing device 220 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the computing device 220 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the computing device 220 may include a greater or lesser number of components than those illustrated.

Figure 3:
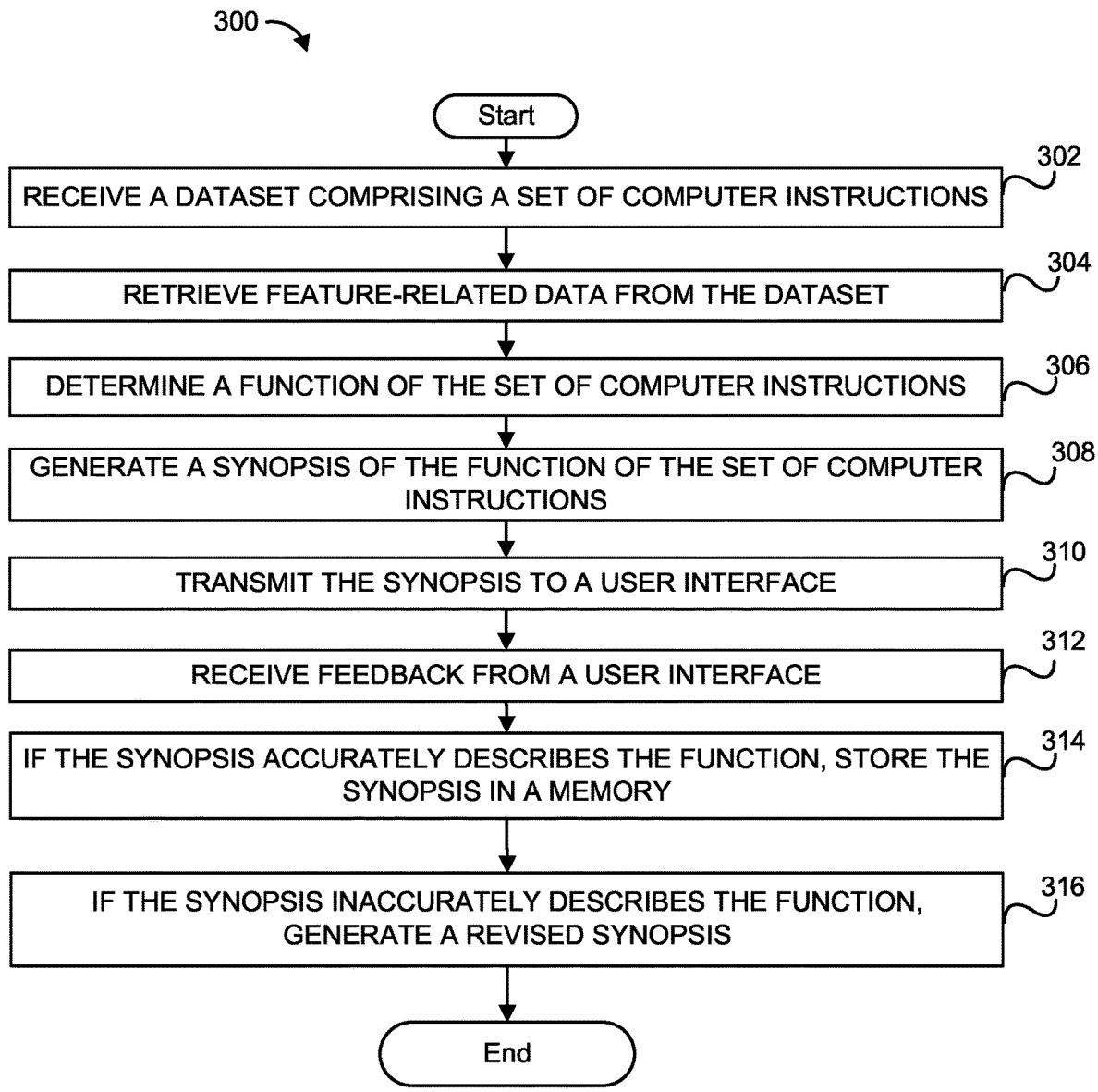
FIG. 3 is a flow diagram illustrating an exemplary method of managing a software repository, in accordance with an example of the disclosed technology.

FIG. 3 is a flow diagram illustrating an exemplary method 300 of managing a software repository, in accordance with an example of the disclosed technology. The method 300 can include receiving 302 a dataset comprising a set of computer instructions. For example, the dataset can be a set of computer instructions that are stored in the software repository 102. The method 300 can include retrieving 304 feature-related data from the dataset and then determining 306 a function of the set of computer instructions. To illustrate, retrieving 304 feature-related data from the dataset can include executing the machine learning model (e.g., the repository intent model 104) via the application 106 to parse through the feature data of the set of computer instructions. As described previously, in some examples the machine learning model can include natural language processing and/or natural language understanding to determine 306 a function or purpose for which the set of computer instructions were created.

The method can further include generating 308 a synopsis of the function of the set of computer instructions and transmitting 310 the synopsis to a user interface. A user can then read the synopsis at the user interface and determine whether the synopsis accurately describes the intent of the set of computer instructions. The method 300 can then include receiving 312 feedback from the user interface. Feedback provided by the user can include a simple indication of whether the synopsis accurately describes the function of the set of computer instructions or the feedback can include edits of the synopsis made by the user as described previously.

In response to determining that the synopsis accurately describes the function of the set of computer instructions, the method 300 can include storing 314 the synopsis in a memory. In response to determining that the feedback indicates that the synopsis inaccurately describes the function of the set of computer instructions, the method 300 can include generating 316 a revised synopsis. As an example, generating 316 a revised synopsis can include rerunning the machine learning algorithm to generate a new synopsis. In this way, the method 300 can be or include a supervised machine learning model that can be trained based on inputs received from a user.

Figure 4:
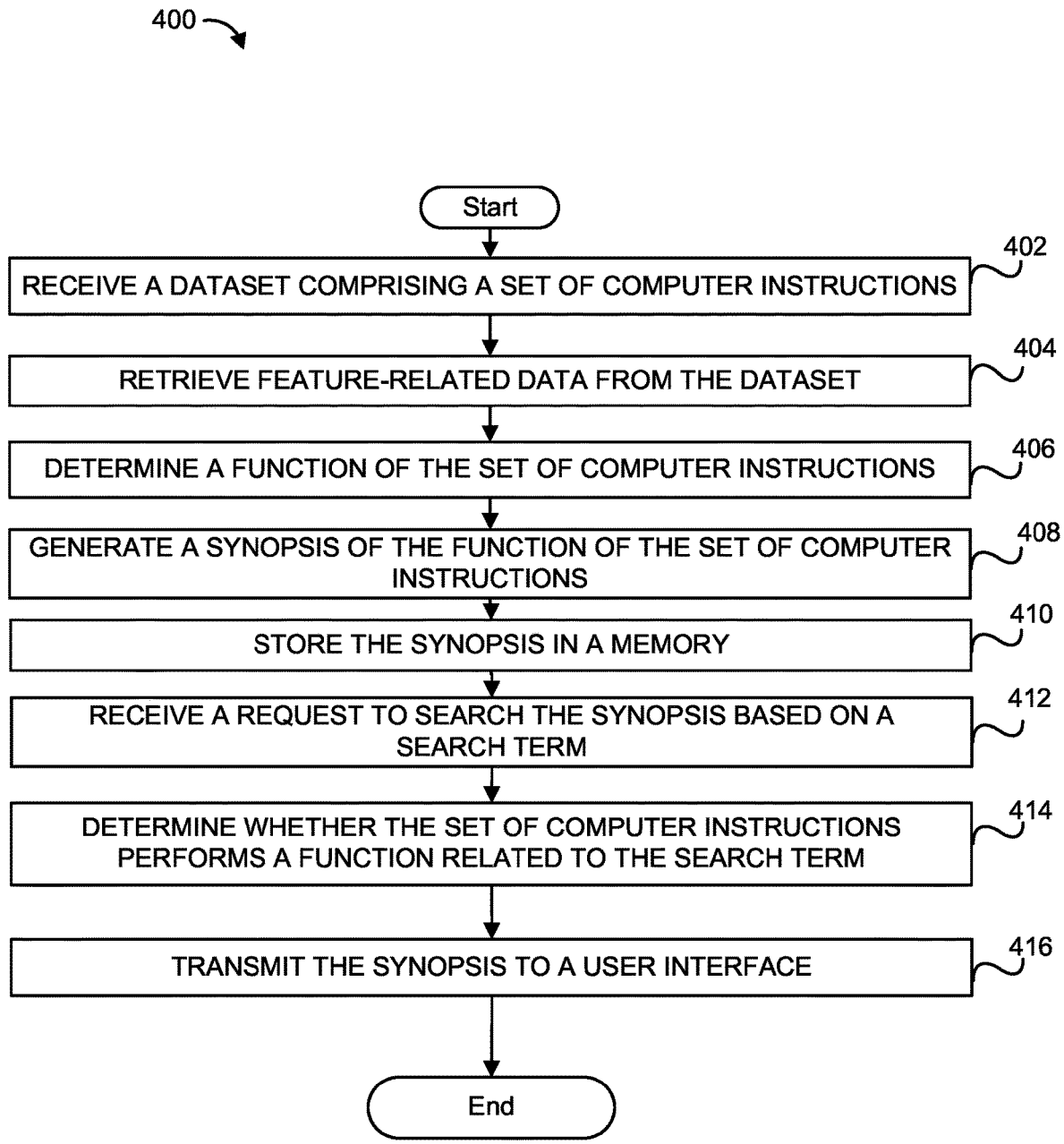
FIG. 4 is another flow diagram illustrating an exemplary method of managing a software repository, in accordance with an example of the disclosed technology.

FIG. 4 is another flow diagram illustrating an exemplary method 400 of managing a software repository, in accordance with an example of the disclosed technology. The method 400 can include receiving 402 a dataset comprising a set of computer instructions, retrieving 404 feature-related data from the dataset, determining 406 a function of the set of computer instructions, generating 408 a synopsis of the function of the set of computer instructions, and storing 410 the synopsis in a memory. As will be appreciated by one of skill in the art, the method 400 can be or include an unsupervised machine learning model that can automatically generate synopses of the various sets of computer instructions stored in the software repository 102.

The method 400 can further include receiving 412 a request to search the synopsis based on a search term, determining 414 whether the set of computer instructions performs a function related to the search term, and transmit 416 the synopsis to a user interface for the user to view if the set of computer instructions performs a function related to the search term. For example, a user can utilize a search engine or other program configured to search the synopses generated by the system 100 to find a particular set of computer instructions. Because the synopses generated by the system 100 contain descriptions of the function or purpose of the sets of computer instructions, a user searching the software repository can effectively search for a set of computer instructions without needing to know a particular name or line of code used in the set of computer instructions. In other words, the user can simply input a description of a set of computer instructions into the search engine and the search engine can search through the synopses to find a set of computer instructions which most closely matches the user's description. In this way, the disclosed technology can make it easier for a user to find a set of computer instructions that meets a particular need of the user.

Exemplary Use Cases

The following exemplary use cases are offered as illustrative examples of implementations of the disclosed technology. The following exemplary use cases are offered solely for explanatory purposes and are not to be construed as limiting.

In a first example, Annie, a software developer, saves a set of computer instructions to a software repository. The set of computer instructions are configured to cause a device to connect to a wireless network. When Annie saves the set of computer instructions to the software repository, a machine learning model utilizes a natural language processing to automatically determine what function or purpose the set of computer instructions was designed to accomplish. The machine learning model then generates a synopsis describing the purpose of the set of computer instructions and store the synopsis in the software repository or a memory associated with the software repository.

Sometime thereafter, James another software developer, searches the software repository to find a set of computer instructions that is capable of connecting a device to a wireless network. James begins reading the various synopses stored in the software repository until he encounters the synopsis generated by the machine learning model describing the set of computer instructions as being capable of enabling a device to connect to a wireless network. James then know that he can use the set of computer instructions in the software program he is currently working on to cause a device to connect to a wireless network.

In a second example, Lucy, a software developer, saves a set of computer instructions configured to cause a computer to automatically scan for viruses to a software repository. When the computer instructions are saved to the software repository, a machine learning model retrieves feature data from the set of computer instructions, automatically determines the function or purpose of the set of computer instructions, and generates a synopsis of the set of computer instructions describing the function of the set of computer instructions. The system then outputs the synopsis to a user interface to alert Lucy of a new synopsis having been generated. Lucy then reads through the synopsis and determines that the synopsis does not accurately describe her set of computer instructions. Lucy may either mark the synopsis as being inaccurate and cause the machine learning algorithm to generate a revised synopsis, or Lucy may edit the synopsis to ensure the synopsis accurately describes the function of the set of computer instructions. The machine learning model then interprets the input receive from Lucy and stores data associated with Lucy's input. Overtime, the machine learning model learns to generate synopses which describe the function of the computer instructions more accurately. The system then stores the synopsis to a memory associated with the software repository for future retrieval.

Sometime thereafter, Abby, another software developer, searches the software repository using a search engine. Abby inputs a description of the type of function she would like computer instruction to be able to perform. In this case, Abby describes the desired set of computer instructions as being able to automatically cause a computer to scan for viruses. The search engine then parses through the various synopses stored in the software repository until the search engine finds the synopsis associated with Lucy's set of computer instructions. Upon locating the synopsis of Lucy's set of computer instructions, the system then displays the synopsis on a user interface to allow Abby to read a description of Lucy's set of computer instructions. Abby can then read the synopsis and determine that Lucy's set of computer instructions would perform the function Abby desires to accomplish.

In some examples, disclosed systems or methods may involve one or more of the following clauses:

Clause 1: A method of managing a software repository, the method comprising: receiving, at a computing device, a dataset comprising a set of computer instructions; retrieving feature-related data from the dataset, the feature-related data comprising data indicative of a feature of the set of computer instructions; determining, by a machine learning model executing on the computing device, a function of the set of computer instructions based on the feature-related data; generating, by the machine learning model, a synopsis comprising a description of the function of the set of computer instructions; transmitting the synopsis to a user interface; receiving, from the user interface, feedback from a user indicative of whether the synopsis accurately describes the function of the set of computer instructions; in response to determining that the feedback indicates that the synopsis accurately describes the function of the set of computer instructions, storing the synopsis in a memory of the computing device; and in response to determining the feedback indicates that the synopsis inaccurately describes the function of the set of computer instructions, generating a revised synopsis of the function of the set of computer instructions.

Clause 2: The method of Clause 1, wherein the machine learning model is trained based on the feedback from the user.

Clause 3: The method of Clause 1, further comprising: receiving, at the computing device, a request to search the synopsis based on a search term; and in response to determining that the set of computer instructions performs a function related to the search term, transmitting the synopsis to the user interface.

Clause 4: The method of Clause 1, wherein generating the revised synopsis of the function of the set of computer instructions further comprises: generating the revised synopsis based on the feedback from the user interface, the feedback comprising edits to the synopsis made by a user.

Clause 5: The method of Clause 1, wherein generating the synopsis comprises natural language processing.

Clause 6: The method of Clause 1, wherein in the machine learning model comprises a recurrent neural network.

Clause 7: The method of Clause 1, wherein the feature-related data comprises programming language of the set of computer instructions.

Clause 8: A method of managing a software repository, the method comprising: receiving, at a computing device, a dataset comprising a set of computer instructions; retrieving feature-related data from the dataset, the feature-related data comprising data indicative of a feature of the set of computer instructions; determining, by a machine learning model executing on the computing device, a function of the set of computer instructions based on the feature-related data; generating, by the machine learning model, a synopsis comprising a description of the function of the set of computer instructions; storing the synopsis in a memory of the computing device; receiving, at the computing device, a request to search the synopsis based on a search term; determining, based on the synopsis and the search term, whether the set of computer instructions performs a function related to the search term; and transmitting the synopsis to a user interface.

Clause 9: The method of Clause 8, further comprising: transmitting the synopsis to a user interface; receiving, from the user interface, feedback from a user indicative of whether the synopsis accurately describes the function of the set of computer instructions; and in response to determining that the feedback indicates that the synopsis accurately describes the function of the set of computer instructions, storing the synopsis in a memory of the computing device.

Clause 10: The method of Clause 9, further comprising: in response to determining the feedback indicates that the synopsis inaccurately describes the function of the set of computer instructions, generating a revised synopsis of the function of the set of computer instructions.

Clause 11: The method of Clause 10, wherein generating a revised synopsis of the function of the set of computer instructions further comprises: generating the revised synopsis based on the feedback from the user interface, the feedback comprising edits to the synopsis made by a user.

Clause 12: The method of Clause 8, wherein generating the synopsis comprises natural language processing.

Clause 13: The method of Clause 8, wherein in the machine learning model comprises a recurrent neural network.

Clause 14: The method of Clause 8, wherein the feature-related data comprises programming language of the set of computer instructions.

Clause 15: A system for managing a software repository, the system comprising: one or more processors; and a memory in communication with the one or more processors and storing instruction that are configured to cause the system to: receive a dataset comprising a set of computer instructions; retrieve feature-related data from the dataset, the feature-related data comprising data indicative of a feature of the set of computer instructions; determine, using a machine learning model, a function of the set of computer instructions based on the feature-related data; and generate, by the machine learning model, a synopsis comprising a description of the function of the set of computer instructions.

Clause 16: The system of Clause 15, wherein the memory stores further instructions that are further configured to cause the system to: transmit the synopsis to a user interface; receive, from the user interface, feedback from a user indicative of whether the synopsis accurately describes the function of the set of computer instructions; and in response to determining that the feedback indicates that the synopsis accurately describes the function of the set of computer instructions, store the synopsis in the memory.

Clause 17: The system of Clause 16, wherein the memory stores further instructions that are further configured to cause the system to: in response to determining the feedback indicates that the synopsis inaccurately describes the function of the set of computer instructions, generate a revised synopsis of the function of the set of computer instructions.

Clause 18: The system of Clause 17, wherein generating a revised synopsis of the function of the set of computer instructions further comprises: generating the revised synopsis based on the feedback from the user interface, the feedback comprising edits to the synopsis made by the user.

Clause 19: The system of Clause 16, wherein the machine learning model is trained based on the feedback from the user.

Clause 20: The system of Clause 15, wherein the memory stores further instructions that are further configured to cause the system to: store the synopsis in a memory; receive a request to search the synopsis based on a search term; determine, based on the synopsis and the search term, whether the set of computer instructions performs a function related to the search term; and in response to determining that the set of computer instructions performs the function related to the search term, transmit the synopsis to a user interface.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner. While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A method of managing a software repository, the method comprising:
receiving a dataset comprising a set of computer instructions;
parsing, by a machine learning model, feature-related data from the dataset;
training the machine learning model using the feature-related data from the dataset;
determining, by the machine learning model using natural language processing, a function of the set of computer instructions based on text in comments included in the feature-related data;
generating, by the machine learning model, a synopsis comprising a description of the function of the set of computer instructions;
storing the synopsis in a memory of a device;
receiving feedback from a user indicative of whether the synopsis accurately describes the function of the set of computer instructions; and
in response to receiving the feedback, training the machine learning model with the feedback from the user.

2. The method of claim 1, further comprising:
in response to determining that the feedback indicates that the synopsis accurately describes the function of the set of computer instructions, storing the synopsis in the memory of the device; and
in response to determining the feedback indicates that the synopsis inaccurately describes the function of the set of computer instructions, generating, by the machine learning model, a revised synopsis of the function of the set of computer instructions based on the feedback from the user.

3. The method of claim 2, further comprising:
receiving a request to search the synopsis based on a search term; and
in response to determining that the set of computer instructions performs a function related to the search term, transmitting the synopsis to a user interface.

4. The method of claim 2, wherein generating the revised synopsis of the function of the set of computer instructions further comprises:
generating the revised synopsis based on the feedback from a user interface, the feedback comprising edits to the synopsis made by a user.

5. The method of claim 1, wherein generating the synopsis comprises natural language processing.

6. The method of claim 1, wherein in the machine learning model comprises a recurrent neural network.

7. The method of claim 1, wherein the feature-related data comprises programming language of the set of computer instructions.

8. A method of managing a software repository, the method comprising:
parsing, by a machine learning model, feature-related data from a dataset;
training the machine learning model using the feature-related data from the dataset;
determining, by the machine learning model, a first function of a set of computer instructions based on the feature-related data;
generating, by the machine learning model, a synopsis comprising a description of the first function of the set of computer instructions;
storing the synopsis in a memory;
receiving a request to search the synopsis based on a search term, wherein the request comprises a second description of the first function for the set of computer instructions;
determining, based on the request, whether the set of computer instructions would perform a second function related to the search term;
transmitting the synopsis to a user interface;
receiving feedback from a user indicative of whether the synopsis accurately describes the first function of the set of the computer instructions; and
in response to receiving the feedback, training the machine learning model with the feedback from the user.

9. The method of claim 8, further comprising:
in response to determining that the feedback indicates that the synopsis accurately describes the first function of the set of computer instructions, storing the synopsis in the memory.

10. The method of claim 9, further comprising:
in response to determining the feedback indicates that the synopsis inaccurately describes the first function of the set of computer instructions, generating a revised synopsis of the first function of the set of computer instructions.

11. The method of claim 10, wherein generating a revised synopsis of the first function of the set of computer instructions further comprises:
generating the revised synopsis based on the feedback from a second user interface, the feedback comprising edits to the synopsis made by the user.

12. The method of claim 8, wherein generating the synopsis comprises natural language processing.

13. The method of claim 8, wherein the machine learning model comprises a recurrent neural network.

14. The method of claim 8, wherein the feature-related data comprises programming language of the set of computer instructions.

15. A system for managing a software repository, the system comprising:
one or more processors; and
a memory in communication with the one or more processors and storing instruction that are configured to cause the system to:
parse, by a machine learning model executing on the one or more processors, feature-related data from a dataset, the feature-related data comprising data indicative of a feature of a set of computer instructions;
train the machine learning model using the feature-related data from the dataset;
determine, using the machine learning model, a function of the set of computer instructions based on the feature-related data;
generate, by the machine learning model, a synopsis comprising a description of the function of the set of computer instructions;
receive feedback from a user indicative of whether the synopsis accurately describes the function of the set of computer instructions; and
in response to receiving the feedback, train the machine learning model with the feedback from the user.

16. The system of claim 15, wherein the memory stores further instructions that are further configured to cause the system to:
determine whether the feedback indicates the synopsis accurately describes the function of the set of computer instructions; and
in response to determining that the feedback indicates that the synopsis accurately describes the function of the set of computer instructions, store the synopsis in the memory.

17. The system of claim 16, wherein the memory stores further instructions that are further configured to cause the system to:
in response to determining the feedback indicates that the synopsis inaccurately describes the function of the set of computer instructions, generate a revised synopsis of the function of the set of computer instructions.

18. The system of claim 17, wherein generating a revised synopsis of the function of the set of computer instructions further comprises:
generating the revised synopsis based on the feedback, the feedback comprising edits to the synopsis made by the user.

19. The system of claim 15, wherein the memory stores further instructions that are further configured to cause the system to:
store the synopsis in a memory;
receive a request to search the synopsis based on a search term;
determine, based on the synopsis and the search term, whether the set of computer instructions performs a function related to the search term; and
in response to determining that the set of computer instructions performs the function related to the search term, transmit the synopsis to a user interface.

* * * * *